United States Patent [19]

Van Scott et al.

[11] 3,879,537

[45] Apr. 22, 1975

[54] TREATMENT OF ICHTHYOSIFORM DERMATOSES

[76] Inventors: Eugene J. Van Scott, 1138 Sewell Ln., Rydall, Pa. 19046; Ruey J. Yu, 4400 Dexter St., Philadelphia, Pa. 19128

[22] Filed: Sept. 4, 1973

[21] Appl. No.: 394,269

[52] U.S. Cl. .................. 424/311; 424/283; 424/317
[51] Int. Cl............................................ A61k 27/00
[58] Field of Search ............. 424/68, 317, 311, 283, 424/31

[56] References Cited
UNITED STATES PATENTS

| | | | |
|---|---|---|---|
| 2,118,566 | 5/1938 | Miles | 424/317 |
| 3,124,506 | 3/1964 | Holman | 424/317 |
| 3,259,545 | 7/1966 | Teller | 424/68 |
| 3,608,086 | 9/1971 | Halpern | 424/317 |
| 3,666,863 | 5/1972 | Swanbeck | 424/317 |

OTHER PUBLICATIONS

Merck Index, 8th Edition, 1968, pp. 267, 496, 501, 549, 640, 897, 1014, 1015.

Primary Examiner—Albert T. Meyers
Assistant Examiner—Norman A. Drezin
Attorney, Agent, or Firm—LeBlanc & Shur

[57] ABSTRACT

A treatment to alleviate the symptoms of ichthyosis consisting of topical application of an ointment or lotion containing one or more lower aliphatic compounds having from two to about six carbon atoms, and preferably having α-carbon functionality is disclosed. The compounds include α-hydroxy acids, keto acids and esters thereof, and 3-hydroxy butyric acid. The therapeutic composition may include one or more of the compounds present in a total amount of from 1 to 20 percent by weight in either a water or alcohol solution, or an ointment. Topical application to affected areas has been found to achieve complete remission of ichthyotic conditions in humans.

6 Claims, No Drawings

TREATMENT OF ICHTHYOSIFORM DERMATOSES

This invention relates to a treatment for ichthyosis and specifically to compounds which have been found to be effective when topically applied, to heal the skin lesions associated with ichthyosis in humans.

The term ichthyosis alludes to a fish scale-like appearance of the human skin. In dermatology, ichthyotic conditions are classified as ichthyosiform dermatoses which are hereditary disorders wherein excessive amounts of scale accumulates on the skin surface.

There are four types of ichthyosis known. Each type has a characteristic genetic mode of inheritance, and each type exhibits different clinical and cellular kinetic characteristics. The four types known are identified as follows:

1. *Ichthyosis vulgaris*, characterized by a "dry skin" appearance, is first detected during the early years of childhood. Small, fine scales with a "pasted-on" appearance are found most prominently on the truck and upper extremities. Larger, more adherent scales are present on the legs.

2. *Lamellar ichthyosis* is marked by almost universal scaling, and is present at birth, presisting into adulthood. The scales are large, 0.5 to 1.5 centimeters in diameter, gray-brown in color, and, frequently, adherent at their centers with slightly raised edges.

3. *Epidermolytic hyperkeratosis* is characterized by a thick, scaly mantle which covers the body at birth. The mantle is shed almost immediately and leaves a raw body surface. The skin then gradually becomes dry and scaly again and assumes the changes characteristics of this disorder.

4. *X-linked ichthyosis* affects primarily males and is characterized by scales prominent on the trunk, neck and extremities.

Conventional treatments for ichthyotic conditions primarily involve the topical application of hydrating emollients. In addition, ointments containing salicylic acid or vitamin A acid have been used. Prior treatments, however, have not been universally successful, and have been, in many cases, unable to promote healing to cause a complete remission of the symptoms. Because the mechanism whereby the genetic mode of inheritance results in an ichthyotic condition is not known, treatment has at best resulted in a temporary remission or healing of the scaly lesions.

It was suggested by Stern in an article appearing in *The Urologic and Cutaneous Review*, Volume 50, page 106 (1946) that certain dermatoses were related to insufficient acidity in the epidermal acid layer or coat. Accordingly, certain dermatoses including one reported case of ichthyosis where apparently successfully treated by lowering the pH of the patient's acid coat. The treatment included the topical application of a 3% buffered, lactic acid containing cream.

Providing an artificial acid coat has, on further investigation, been disproven as a viable treatment for dermatoses such as ichthyosis. Increasing the acidity of the epidermal coating alone does not cause a remission of the symptoms. Although a higher pH or a neutral or alkaline condition may be observed in certain cases lowering the pH does not reliably result in a remission, contrary to the assertions of Stern.

However, it has now been discovered that ichthyotic conditions maybe successfully treated by utilizing at least one of several compounds characterized generally as organic acids and esters thereof, having from two to six carbon atoms and having alpha or in some cases beta carbon functionality. These compounds include $\alpha$-hydroxy substituted acids, keto acids having $\alpha$-carbon functionality, their esters, and 3-hydroxybutyric acid. The compounds tested and found to be effective are glycolic acid, citric acid, lactic acid, malic acid, tartronic acid, tartaric acid, glucuronic acid; the keto acid, pyruvic acid, together with its ethyl and methyl esters; 2-hydroxyisobutyric acid and 3-hydroxy butyric acid.

It should be emphasized, however, that although other compounds within the aforementioned designation may be found to be effective, many are not. For example, fumaric and succinic acids were found to be totally ineffective in causing remissions of the ichthyotic conditions.

Furthermore, the effectiveness of the esters of pyruvic acid verify that the pH of the epidermal acid coat is not the proper mechanism for evaluating a treatment for ichthyosis.

It has been established through extensive tests on animals and humans having ichthyotic conditions that topical application of either an alcohol or water solution, or an ointment containing from 1 to 20% of at least one of the above compounds, and preferably from 5 to 10% thereof is effective, when applied on a daily basis to cause, within about one to two weeks time, a return of the affected areas to a normal skin condition. If two or more compounds are used in a composition of this invention, the total concentration of the compounds is preferred not to exceed 10% by weight of the composition.

Accordingly, it is the object of this invention to provide a medicinal composition containing at least one lower organic hydroxy acid, keto acid, and esters thereof, which when topically applied will reliably alleviate the symptoms of ichthyosis.

It is another object to provide a method for treating ichthyosis with a non-toxic ointment or solution of water or alcohol soluble lower organic compounds.

It is another object to provide a safe and efficient method for treating the symptoms of ichthyosis through regular topical application of a medicinal composition which will promote healing within about one to two weeks.

It is still another object to provide a method for treating ichthyosis dermatoses by topical application of a composition containing at least one organic acid or ester thereof having from two to six carbon atoms and having $\alpha$-carbon functionality which is effective to promote healing of ichthyotic skin lesions.

It is still another object of this invention to provide a method for formulating a medicinal composition in ointment or lotion form which when applied at least daily topically to lesions of ichthyosis will result in a restoration of normal healthy skin condition.

It is yet another object of this invention to provide a medicinal composition useful for topical application to treat ichthyosis including a water or alcohol solution of lower aliphatic acids, keto acids and their esters, having from two to six carbon atoms and $\alpha$-carbon functionality wherein at least one of said acid is present in said composition in from 1 to 20% by weight.

Specifically, the compounds of this invention found to be useful in the treatment of ichthyosis are the $\alpha$-hydroxy acids having from two to six carbon atoms, glycolic acid, lactic acid, citric acid, malic acid, tartronic acid, tartaric acid, and glucuronic acid; the keto acid, pyruvic acid, and its methyl and ethyl esters; 2-hydroxyisobutyric acid and 3-hydroxy butyric acid.

PREPARATION OF THE THERAPEUTIC COMPOSITIONS

In order to prepare the compositions of this invention, at least one of the above compounds is preferably dissolved in water or ethanol initially. The solution thus prepared may be admixed in the conventional manner with commonly available ointment bases such as hydrophilic ointment (USP) or petrolatum (USP). The concentration of the compound ranges from 1 to 20% by weight of the total composition. The preferred concentration range, however, is from 5 and 10%.

If desired, two or more of the above compounds may be admixed in an ointment as described above to form a composition of this invention. In this instance, it is preferred that the concentration of the compounds not exceed a total of 10% by weight.

The water or ethanol used to dissolve the compound according to this invention may range in concentration of from 1 to 30%, by volume, of the total composition. The preferred concentration thereof, however, is 10%, by volume.

It has been found that the therapeutic ointments of this invention, prepared as above, may be stored in ointment jars at room temperature for extended periods of time without a change in clinical effectiveness.

The above compounds may also be prepared in a solution or lotion form. A typical solution of this invention utilizes at least one of the above compounds, dissolved directly in a mixture of water, ethanol and propylene glycol in a weight ratio of 40:40:20, respectively. The ratio of each vehicle may vary; however, the preferred concentrations of ethanol and propylene glycol should not exceed 70% and 30%, respectively. When solutions are formulated according to this invention, the compound concentration range may be from 1 to 20% by weight as above. In addition, a concentration of from 5 to 10% is preferred. One or more of the compounds may also be admixed to a total concentration not exceeding about 10% by weight, as described above.

The following are illustrative examples of formulations of compositions according to this invention. Although the examples utilize only selected members of the above listed compounds useful according to this invention, it should be understood that the following examples are illustrative and not limited. Therefore, any of the above compounds may be substituted according to the teachings of this invention in the following formulations.

EXAMPLE 1

A glycolic acid 5% ointment may be prepared as follows:

Glycolic acid 5g is dissolved in 5 ml of water and the solution admixed with commercially available USP grade hydrophilic ointment (90g) to a uniform consistency. Alternatively, glycolic acid 5g may be dissolved in 10 ml in anhydrous ethyl alcohol, and the solution admixed with 51g white petrolatum and 34g liquid petrolatum. The ointment thus prepared is stored in preferably opaque jars at room temperature.

EXAMPLE 2

An ointment of combined compounds is prepared as follows:

Glycolic acid 2g, lactic acid 2g, citric acid 2g and pyruvic acid 2g are dissolved in 10 ml water and the solution is admixed with USP grade hydrophylic ointment (82g) to a uniform consistency. Alternatively, as above, the four compounds may be dissolved in 10 ml anhydrous ethyl alcohol and the solution admixed with a white petrolatum, liquid petrolatum base. This ointment also may be stored in opaque jars at room temperature.

TEST RESULTS

Each of the aforementioned compounds was initially subjected to a series of screening tests with Rhino mice, and ICR white mice. In each instance, the compound was dissolved in one of the following solutions:

a. water, ethanol, propylene glycol, (10:80:10)

b. Acetone, ethanol (50:50). The prepared solutions were topically applied to the backs of mice one daily for a period of 1, 2, or 3 weeks. In the case of the ICR mice, hair was removed by plucking the test site before topical applications of test solution were initiated. Each test drug preparation was applied to 5 rhino mice and 10 ICR mice.

At the end of 1, 2, or 3 weeks, biopsy samples of skin were taken from the test sites, fixed in 10% buffered formalin and embedded in paraffin. Histologic sections were cut at $6\mu$, stained with hematoxylin and eosin and examined for histologic features under a microscope to determine the effects of topically applied test compound on thickness and changes in the epidermis, the epidermal granular layer and and the stratum corneum.

In addition, each compound was further tested for toxicity by subcutaneous injection of various concentrations into ICR mice. Ten ICR mice were employed for each test compound.

The above screening tests indicated that all compounds listed were non-toxic, and with the exception of glycolic acid and pyruvic acid exhibited little change in the epidermis, the epidermal granular layer, or the stratum corneum. Glycolic acid indicated an increase in the thickness of the granular layer in rhino and ICR mice skin, and pyruvic acid exhibited a decrease in the thickness of the stratum corneum of ICR mouse skin.

Following screen tests, 7 patients having ichthyosis, as will be described, were treated with a composition as follows:

Patients with ichthyosis were instructed first to wet the body by taking a shower and then applying a thin film of a 5% ointment formulated according to Example 1 above to the lesions. Twice daily topical application was continued for several weeks. Generally, the affected skin became less scaly and felt smoother after about a week of topical treatment. The scaly lesions ordinarily were substantiallly clear after two weeks of treatment. The sites of the lesions, devoid of any scales, usually reached an improved state comparable to normal appearing skin within two to four weeks after initial treatment.

Once a normal appearing skin was restored, it remained improved for from several weeks to several months, varying from patient to patient, without further application of the ointment. It is, however, necessary to continue the application of the ointment in order to maintain the skin free from recurrence of the overt disease.

The ointment in a concentration of 10% was similarly tested, and daily applications were found to be sufficient to clear the lesions and restore the skin to apparent normalcy.

Finally, the combination ointment of Example 2 above was also tested in the aforementioned manner. Generally, the scaly lesions were cleared after about two weeks of twice-daily topical applications. The topical treatment was continued from time to time when it was necessary to keep the skin free from discernible signs of the disease.

The relative effectiveness of the compounds of this invention was also evaluated in clinical tests as above with six patients. The Table below summarizes the results thereof with each of the 11 compounds of this invention applied in 5% ointments.

ICHTHYOSIS

| Compound | Patients | | | | | |
|---|---|---|---|---|---|---|
| | F.M. | K.J. | R.J. | L.W. | I.C. | P.P. |
| 1. Glycolic Acid | 4 + | 4 + | 4 + | 4 + | 3 + | 4 + |
| 2. Citric Acid | 4 + | 3 + | 4 + | 4 + | 3 + | 4 + |
| 3. Malic Acid | 3 + | 4 + | 4 + | | 3 + | 3 + |
| 4. Tartronic Acid | 4 + | | | | | 3 + |
| 5. Tartaric Acid | 4 + | 2 + | 4 + | | | 4+ |
| 6. Glucuronic Acid | 4 + | | | | | 3 + |
| 7. Pyruvic Acid | 4 + | 4 + | 4 + | 4 + | | 4 + |
| 8. Ethyl Pyruvate | 4 + | 3 + | 4 + | 4 + | | 3 + |
| 9. Methyl Pyruvate | 4 + | 3 + | 4 + | 3 30 | | 4 + |
| 10. 2-Hydroxyisobutyric Acid | 4 + | | | | | 3 + |
| 11. 3-Hydroxy Butyric Acid | 4 + | | | | | 2 + |

2 + : Substantial improvement of the lesions.
3 + : Disappearance of scale from lesions.
4 + : Restoration to normal looking skin.

While, as shown by the above Table, each compound was not tested for relative effectiveness with each of the six patients, each compound achieved a 4 + result in at least one patient, and five of the six patients achieved a restoration of normal looking skin. Each of the eleven compounds also achieved a complete restoration of normal looking skin in at least one patient. The method of application utilized herein generally required twice daily topical applications, and the scaly lesions ordinarily were substantially cleared after about two weeks of treatment.

As noted above treatment with the compositions of this invention, however, does not result in a permanent cure. When regular application of a composition of this invention is terminated, normal appearing skin will remain for varying periods of time from several weeks to several months depending upon the patient. However, when regular application is resumed the lesions again disappear and normal appearing skin is restored.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of treating icthyosis in humans suffering therefrom comprising topically applying to involved areas of the body an effective amount of a composition containing from one to about twenty percent by weight of at least one compound selected from the group consisting of glycolic acid, citric acid, malic acid, tartronic acid, tartaric acid, glucuronic acid, pyruvic acid, ethyl pyruvate, methyl pyruvate, 2-hydroxy isobutyric acid, and 3-hyroxy butyric acid in admixture with a pharmaceutically acceptable carrier.

2. The method of claim 1 wherein said composition further comprises as an additional ingredient from 2 to about 8 percent lactic acid.

3. The method of claim 1 wherein said compound is present in from about 5 to about 10 percent by weight.

4. The method of claim 1 wherein said composition is in the form of an ointment containing said compound dissolved in about one to about 30 percent by volume of a solvent selected from the group consisting of water and ethanol and admixed with an ointment base selected from the group consisting of petrolatum and hydrophilic ointment.

5. The method of claim 1 wherein said carrier is a solution of water, ethanol, and propylene glycol, said ethanol being present in no more than about 70 percent by weight, and said propylene glycol is present in no more than about 30 percent by weight.

6. The method of claim 5 wherein said solution is an admixture of water, ethanol, and propylene glycol present in a weight ratio of 40:40:20.

* * * * *